US009088432B2

(12) United States Patent
Hidaka

(10) Patent No.: US 9,088,432 B2
(45) Date of Patent: Jul. 21, 2015

(54) REMOTE CONTROL SYSTEM, REMOTE CONTROL METHOD AND PROGRAM FOR REMOTE CONTROL

(75) Inventor: Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 13/580,631

(22) PCT Filed: Feb. 18, 2011

(86) PCT No.: PCT/JP2011/053575
§ 371 (c)(1),
(2), (4) Date: Oct. 17, 2012

(87) PCT Pub. No.: WO2011/105303
PCT Pub. Date: Sep. 1, 2011

(65) Prior Publication Data

US 2013/0051398 A1 Feb. 28, 2013

(30) Foreign Application Priority Data

Feb. 23, 2010 (JP) ................................ 2010-037533

(51) Int. Cl.
*H04L 12/28* (2006.01)

(52) U.S. Cl.
CPC .... *H04L 12/2818* (2013.01); *G06F 2213/0038* (2013.01)

(58) Field of Classification Search
CPC ......... H04L 12/00; H04L 12/28; H04L 12/44; H04L 12/54; H04L 12/56; H04L 12/407; H04L 12/721; H04L 45/44; H04L 45/74; H04L 47/10; H04L 47/11; H04L 49/15; H04L 49/65; H04L 49/90; H04L 67/2842
See application file for complete search history.

(56) References Cited

U.S. PATENT DOCUMENTS

| | | | | |
|---|---|---|---|---|
| 6,873,602 | B1 * | 3/2005 | Ambe | 370/254 |
| 7,920,567 | B2 | 4/2011 | Seto et al. | |
| 8,144,582 | B2 * | 3/2012 | Brown et al. | 370/230.1 |

(Continued)

FOREIGN PATENT DOCUMENTS

| | | |
|---|---|---|
| CN | 101086727 A | 12/2007 |
| JP | 9-294139 A | 11/1997 |

(Continued)

OTHER PUBLICATIONS

International Search Report in PCT/JP2011/053575 dated May 17, 2011 (English Translation Thereof).

(Continued)

*Primary Examiner* — Kevin C Harper
(74) *Attorney, Agent, or Firm* — McGinn IP Law Group, PLLC

(57) ABSTRACT

In a switching node, a low-load and high-speed control is performed without using a CPU and a network protocol, such as TCP/IP, which have been conventionally used for control from a remote control server, to realize a high-end and high-speed network service by making use of the high-speed CPU processing capacity of a remote control server. Specifically, a forwarding engine incorporates a PCI express, a PCI express LAN conversion bridge and a circuit which can access to a local bus control interface from the PCI express on the switching node. The external control server incorporates an extended network service interface driver for managing a plurality of switching nodes.

8 Claims, 6 Drawing Sheets

(56) References Cited

U.S. PATENT DOCUMENTS

| | | | | |
|---|---|---|---|---|
| 2003/0208589 | A1* | 11/2003 | Yamamoto | 709/224 |
| 2005/0246460 | A1 | 11/2005 | Stufflebeam | |
| 2007/0198763 | A1 | 8/2007 | Suzuki et al. | |
| 2008/0071961 | A1 | 3/2008 | Higuchi et al. | |
| 2009/0006710 | A1* | 1/2009 | Daniel et al. | 710/315 |
| 2010/0161872 | A1* | 6/2010 | Daniel | 710/316 |
| 2011/0153906 | A1 | 6/2011 | Suzuki et al. | |

FOREIGN PATENT DOCUMENTS

| | | | |
|---|---|---|---|
| JP | 2000-151672 | A | 5/2000 |
| JP | 2003-348171 | A | 12/2003 |
| JP | 2005-317021 | A | 11/2005 |
| JP | 2006-202210 | A | 8/2006 |
| JP | 2006-345366 | A | 12/2006 |
| JP | 2007-219873 | A | 8/2007 |
| JP | 2008-22075 | A | 1/2008 |
| JP | 2008-078887 | A | 4/2008 |
| JP | 2008-160468 | A | 7/2008 |
| JP | 2008-193614 | A | 8/2008 |
| JP | 2008-219828 | A | 9/2008 |
| JP | 2010-28448 | A | 2/2010 |

OTHER PUBLICATIONS

OpenFlow: Enabling Innovation in Campus Networks (http://www.openflowswitch.org/documents/openflow-wp-latest.pdf).

Japanese Office Action dated Aug. 6, 2013, with English translation.

Chinese Office Action dated Jul. 1, 2014 and Partial English Translation thereof.

* cited by examiner

REMOTE CONTROL SYSTEM, REMOTE CONTROL METHOD AND PROGRAM FOR REMOTE CONTROL

TECHNICAL FIELD

The present invention relates to a remote control system, especially to a remote control system which performs remote control of a switch node.

BACKGROUND ART

In a conventional network switch node configuration as described in non-patent literature 1, a CPU (central processing unit), a TCP/IP (transmission control protocol/internet protocol) stack and a network driver are inevitably involved with an interaction between a network switch node and a control server. Accordingly, the load of processing in the control by using the CPU, such as protocol processing, is large, making it hard to perform a high-speed control.

Also, since the interaction between the network switch node and the control server is achieved by once using a network protocol, the function of enabling control of a forwarding engine of the switch node from the server is limited to a prescribed protocol. Accordingly, the function is limited to, for example, setting of a table, and a complex protocol is further necessary for achieving a control with fine grading, such as register setting; this causes a problem of large processing load.

[Conventional System Configuration]

FIG. 1 shows a conventional system configuration in which an extended network service is executed on a control server.

In the conventional system configuration, a switching node 10 includes a network switch forwarding engine 100, a PCI express switch 200, a CPU 300, a memory 350 and an equipment management device 400.

The network switch forwarding engine 100 forwards frames received from terminals 1 to 3. The PCE express switch 200 interfaces frames and control commands between the network switch forwarding engine 100 and the CPU 300. The PCI express switch 200 may be incorporated within the network switch forwarding engine 100.

It should be noted that the PDU (protocol data unit) used in the communication in the second layer of the OSI reference model (Layer 2: data link layer) is referred to as frame, and the PDU used in the communication in the third layer of the OSI reference model (Layer 3: network layer) is referred to as packet. Hereinafter, the frame is defined as carrying a packet. In other words, the frame and the packet are interchangeable.

The CPU 300 performs conventional network services, device controls and the like. Also, when performing an extended network service, the CPU 300 uses a network protocol and cooperates with the server 20 via an interface (I/F) called "PCI express", which is used for a connection with the network switch forwarding engine 100.

Here, the CPU 300 is connected to the network switch forwarding engine 100 via the PCI express switch 200. The network switch forwarding engine 100 is connected to the control server 20 via a LAN (local area network) interface (I/F).

It should be noted that examples of the conventional network services may include conventional frame transfer, packet exchange (switching), routing, and control and configuration of the switching node 10. Also, examples of the extended network service may include externally-achieved routing control, firewall processing and load balancing. It should be noted that actual implementations are not limited to these examples.

The memory 350 stores data to be processed by the CPU 300.

The equipment management device 400 performs control and management of the switching node 10. The equipment management device 400 is not a processor such as a CPU. In the conventional system configuration, the equipment management device 400 is controlled by the CPU 300.

[Configuration of CPU on Conventional Itching Node]

Referring to FIG. 2, a configuration example of the CPU on the conventional switching node is described below. As shown in FIG. 2, the CPU 300 includes a hardware system 310, an operating system 320 and a network protocol 330 in the conventional switching node.

The hardware system 310 includes a PCI express root complex 301 and a local bus control section 302.

The PCI express root complex 301 is provided for achieving communications with the network switch forwarding engine 100. The PCI express root complex 301 is a PCI express device and functions as a root complex.

The local bus control section 302 is provided for achieving communications with the equipment management device 400.

The operating system 320 includes a PCI DMA control module 321, a forwarding engine driver 322, a sorting priority control module 323, a network driver 324 and a TCP/IP stack 325.

The PCI DMA control module 321 uses a PCI express device and thereby performs DMA (direct memory access) transfer control for the network switch forwarding engine 100. The forwarding engine driver 322 is provided for achieving control of the network switch forwarding engine 100 via the PCI express. Here, the forwarding engine driver 322 uses the PCI DMA control module 321. The PCI DMA control module 321 may be implemented as one of the functions of the forwarding engine driver 322.

The sorting priority control module 323 performs sorting and priority control processing on received frames for performing any of processes related to conventional network services and processes related to extended network services.

The network driver 324 is provided to transmit and receive frames via a LAN interface (10G MAC) 104. The TCP/IP stack 325 is provided for achieving protocol communications with the control server 20.

The network protocol 330 includes: a packet interfacing module 331, a conventional network service processing module 332, a packet interfacing module 333, a packet buffering module 334, a service processing inquiry circuitry 335, an encryption circuitry 336, an extended network service configuration module 337, and an equipment management control service processing module 338.

The packet interfacing modules 331 and 332 exchange frames with the network switch forwarding engine 100 by using the forwarding engine driver 322. Here, the packet interfacing modules 331 and 333 use the forwarding engine driver 322 and the PCI DMA control module 321 to perform DMA transfer control for the network switch forwarding engine 100. Also, the packet interfacing modules 331 and 333 convert frames received from the sorting priority control module 323 into a packet format.

When performing a process related to a conventional network service on a received frame, the sorting priority control module 323 conventionally transmits the received frame to the packet interfacing module 331.

When performing a process related to an extended network service on a received frame, on the other hand, the sorting priority control module 323 conventionally transmits the received frame to the packet interfacing module 333.

Furthermore, the sorting priority control module 323 performs the sorting and priority control processing for both of packets based on the conventional network service and packets based on the extended network service, and transmits the packets to the network switch forwarding engine 100 by using the forwarding engine driver 322.

The conventional network service processing module 332 controls the network forwarding engine 100 by using the PCI express. Here, the conventional network service processing module 332 performs a process related to a conventional service protocol on packets received from the packet interfacing module 331. The packet interfacing module 331 converts packets received from the conventional network service processing module 332 into a frame format, and transmits the frames to the network switch forwarding engine 100 by using the forwarding engine driver 322.

The packet buffering module 334 is provided for temporal buffering of packets received from the packet interfacing module 333 in waiting control from the control server 20. The service processing inquiry circuitry 335 is provided for making inquiries to the control server 20. The encryption circuitry 336 is provided for performing encryption and decryption in making inquiries to the control server and responding to the inquiry results. The extended network service configuration module 337 is provided for configuring the network switch forwarding engine 100 via the PCI express in response to the results of the inquiries to the control server 20.

The equipment management control service processing module 338 controls the equipment management device 400 by using the local bus control section 302 for device control in the switching node 10.

As thus described, in the conventional system configuration, the process related to the extended network service performed on the external control server 20, the process related to the conventional network service processing executed on local and the equipment management control service processing are executed on the operating system on the CPU 300.

It should be noted that, on the conventional switching node 10, the CPU 300 exchanges control frames with the control server 20 via the network switch forwarding engine 100 by using the TCP/IP stack 325, the network driver 324 and the forwarding engine driver 322, since the PCI express is available only for the internal control when performing the extended network service using the external control server 30.

[Conventional Configuration of Control Server]

FIG. 3 shows a configuration example of the conventional control server 20. As shown in FIG. 3, the control server 20 include a network interface 500 and a CPU 600.

The network interface 500 includes a LAN interface (10G MAC) 501 and a PCI express endpoint 502.

The LAN interface (10G MAC) 501 is provided for achieving communications with the switching node 10.

The PCI express endpoint 502 is provided for achieving communications with the CPU 600. The PCI express endpoint 502 is a PCI express device and functions as an endpoint.

The CPU 600 includes a hardware system 610, an operating system 620 and a network protocol 630.

The hardware system 610 includes a PCI express root complex 601.

The PCI express root complex 601 is provided for achieving communications with the network interface 500. The PCI express root complex 601 is a PCI express device and functions as a root complex.

The operating system 620 includes a network driver 621 and a TCP/IP stack 622.

The network driver 621 controls the network interface 500. The TCP/IP stack 622 is provided for achieving communications with the switching node 10.

The network protocol 630 includes a packet interfacing module 631, an encryption circuitry 632 and an extended network service processing module 633.

The packet interfacing module 631 exchanges frames with the switching node 10 in a packet format. The encryption circuitry 632 performs encryption and decryption when the packet interfacing module 631 transmits and receives frames. The extended network service processing module 633 provides services and protocols to be executed on the control server.

In the conventional system configuration, the CPU 600 receives control frames from the network switch forwarding engine 100 via the network interface 500. On the CPU 600, the control frames are delivered to the extended network service processing module 633 through the TCP/IP stack 622 and the network driver 621, which are used for receiving the control frames.

In the conventional system configuration, as described above, the CPU, the TCP/IP stack and the network driver on the network switch node are inevitably involved with an interaction between a network switch node and a control server, and this causes a large processing load in performing control, such as protocol processing, making it difficult to achieve high-speed control.

Also, since the interaction between the network switch node and the control server is achieved by once using a network protocol, the function of enabling control of a forwarding engine of the switch node from the server is limited to a prescribed protocol. The function is limited to, for example, setting of a table, and therefore a complex protocol is further necessary for achieving a control with fine grading, such as register setting. This causes the problem of the large processing load.

It should be noted that Japanese Patent Application Publication No. 2005-317021 A (patent literature 1) refers to the PCI express. For example, the topology of a PCI express contained in a computing device includes a host bridge and several endpoints (that is, I/O devices) in addition to a CPU and a memory. The connection among a plurality of points is achieved by a switch.

As a related art, an information processing device, a service publication method and a program are also disclosed in Japanese Patent Application Publication No. 2006-202210 A (patent literature 2). In this related art, an UPnP device advertises its own existence for an UPnP control point in accordance with the SSDP (simple service discovery protocol) and publishes a device description and a service description described in the XML format. The UPnP control point discovers the UPnP device and services in accordance with the SSDP, and controls the action of each service with a call based on SOAP. The changes in the state of the UPnP services are notified to UPnP control points which subscribe an event notification based on GENA.

Also, as another related art, a switch and a network bridge device are disclosed in Japanese Patent Application Publication No. 2007-219873 A (patent literature 3). In this related art, a root complex receives commands from a CPU and performs forwarding for peer-to-peer communications between the CPU and peripheral devices and peer-to-peer communications between a memory and the peripheral devices. Here, the communications between the root complex and the peripheral devices are achieved by using packets of the PCI express (that is, TLPs (transaction layer packets)).

CITATION LIST

Patent Literature

Patent literature 1: Japanese Patent Application Publication No. 2005-317021 A
Patent literature 2: Japanese Patent Application Publication No. 2006-202210 A
Patent literature 3: Japanese Patent Application Publication No. 2007-219873 A

Non-Patent Literature

Non-patent literature 1: OpenFlow: Enabling Innovation in Campus Networks (http://www.openflowsswitch.org/documents/openflow-wp-latest.pdf)

DISCLOSURE OF INVENTION

A node configuration is provided for achieving a conventional service protocol process and a high-end service protocol process function in a network switch node by using an external control server.

A remote control system according to the present invention includes a switching node which does not incorporate a CPU and an external control server which remotely controls the switching node. The switching node includes an equipment management device for managing the switching node and a forwarding engine which uses internal frames in accordance with a first standard and external frames in accordance with a second standard; the forwarding engine exchanges the internal frames with the equipment management device, provides a conversion between the internal frames and external frames, and exchanges the external frames with the external control server to request provision of an equipment management control service for the switching node to the external control server.

In a remote control system according to the present invention, a switching node which does not incorporate a CPU is managed by an equipment management device in the switching node.

Also, by a forwarding engine in the switching node, provision of a control service is requested to an external control server by a forwarding engine in the switching node by using internal frames in accordance with a first standard and external frames in accordance with a second standard, exchanging the internal frames with the equipment management device, providing a conversion between the internal frames and the external frames, and exchanging the external frames with the external control server. Also, the switching node is remotely controlled by the external control server.

A program according to the present invention is a program for causing a network device or a computing machine to perform relevant processes out of processes included in the above-described remote control method. It should be noted that a program according to the present invention may be stored in a storage device or a recording medium.

The low-load and high-speed control is achieved in the switching node without using a CPU and a network protocol such as TCP/IP, which have been conventionally used for control from the remote control server (external server), and a high-end and high-speed network service is realized effectively using the high-speed CPU processing capacity of the remote control server.

EMBODIMENTS OF INVENTION

Embodiments

Embodiments of the present invention will be described below with reference to the attached drawings.

[System Configuration]

Figure 1:
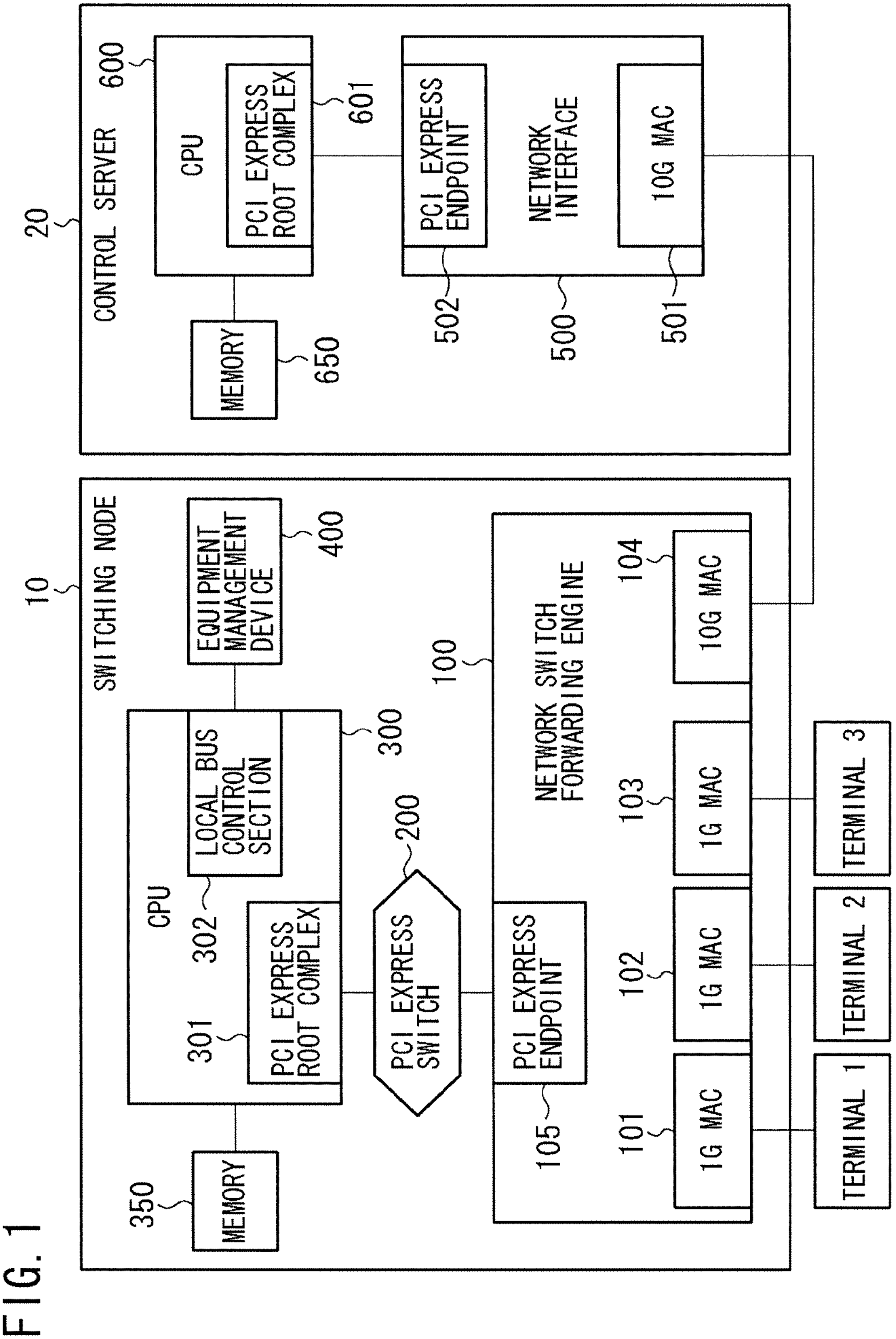
FIG. 1 is a schematic diagram showing an example of the conventional system configuration.
Figure 2:
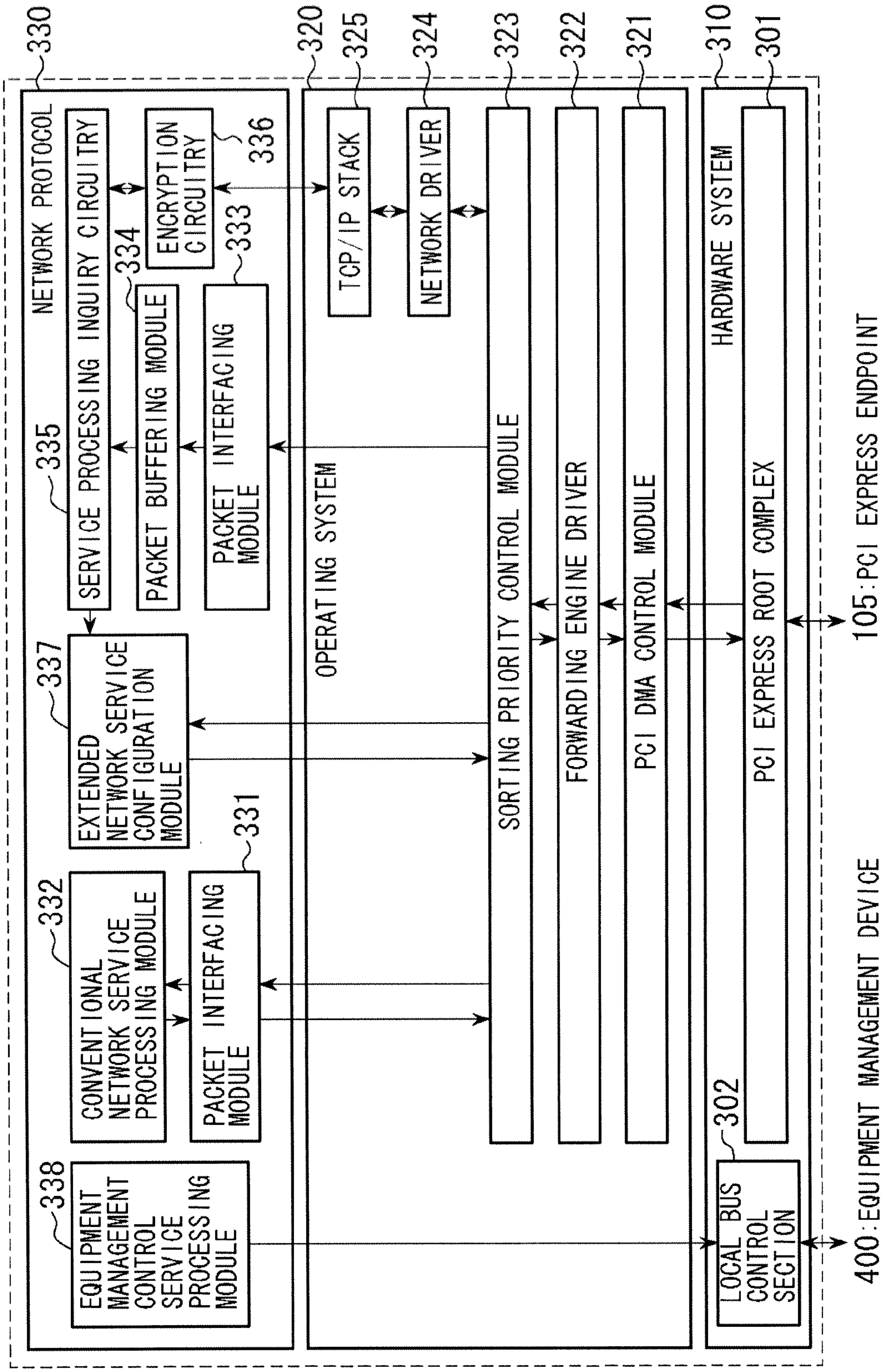
FIG. 2 is a schematic diagram showing an example of the CPU configuration on a conventional switching node.
Figure 3:
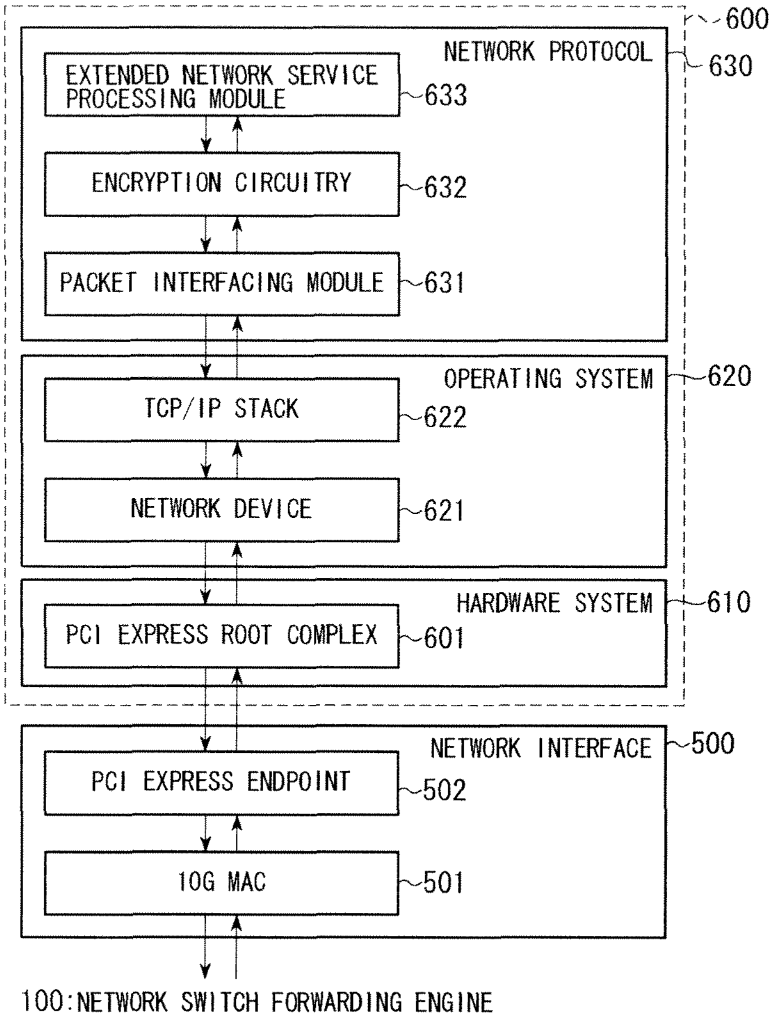
FIG. 3 is a schematic diagram showing an example of a conventional control server.
Figure 4:
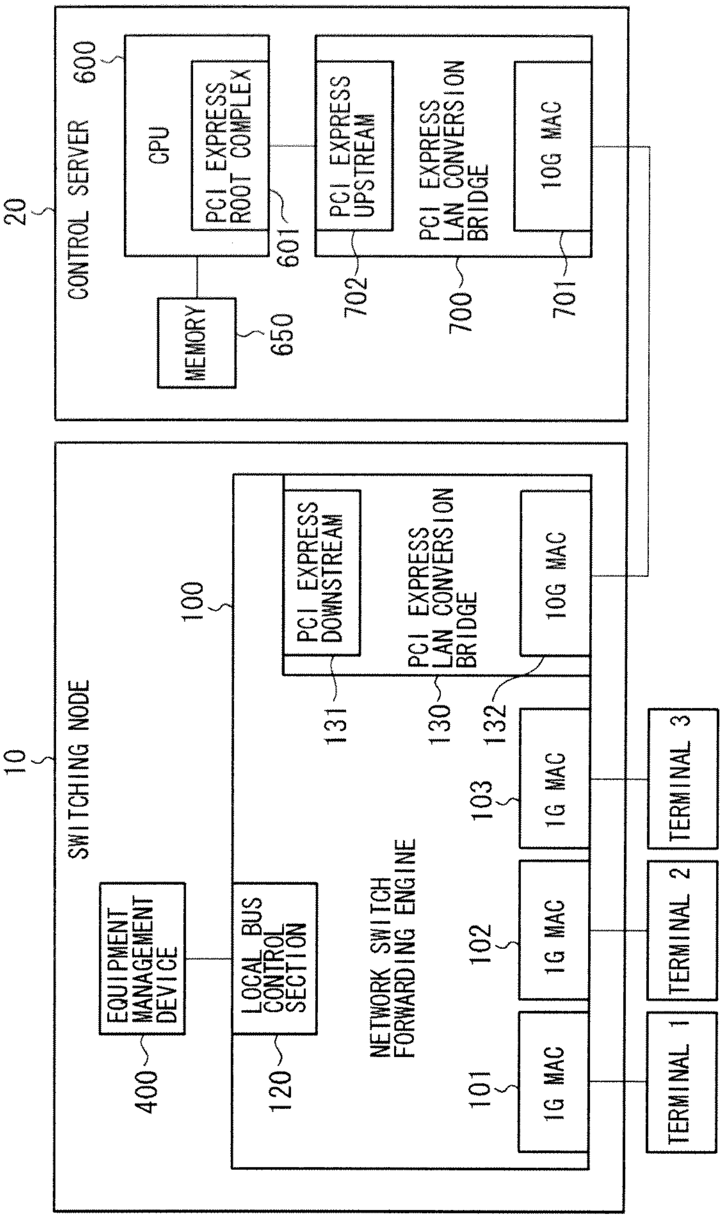
FIG. 4 is a schematic diagram showing an example of a basic configuration of a remote control system according to the present invention.

As shown in FIG. 4, a remote control system of the present invention includes a switching node 10 and a control server (controller) 20.

The switching node 10 is connected to terminals 1 to 3 and the control server 20 via a network. Although only the terminals 1 to 3 and the control server 20 are shown as the connection destinations of the switching node 10 for simplicity, the switching node 10 may be also connected to other servers and switching nodes in an actual implementation. The control server 20 performs conventional network services, equipment management services and extended network services for the switching node 10. It should be noted that a plurality of switching nodes 10 and a plurality of control servers 20 may be provided.

The switching node 10 includes a network switch forwarding engine 100 and an equipment management device 400.

The network switch forwarding engine 100 performs forwarding processing of packets received from the terminals 1 to 3. The equipment management device 400 performs control and management of the switching node 10. The equipment management device 400 is not a processor such as a CPU.

The internal configuration of the switching node 10 may be unified. For example, recent microcomputers and the like increasingly tend to be monolithically integrated. Therefore, in a possible implementation, a one-chip microcomputer incorporated in the switching node 10 may include the network switch forwarding engine 100 and the equipment management device 400.

The control server 20 includes a CPU 600, a memory 650 and a PCI express LAN conversion bridge 700.

The CPU 600 performs conventional network services, equipment management services and extended network services. The memory 650 stores data to be processed by the CPU 600.

The PCI express LAN conversion bridge 700 converts ether frames received from the switching node 10 into PCI express frames, and exchanges the PCI express frames with the CPU 600.

It should be noted that ether frames are external frames used for communications with external devices in the present invention. Also, PCI express frames are internal frames used for in-device communications.

[Examples of Hardware]

In the present invention, assumed examples of the switching node 10 include a network device adapted to the severe environment, in which installation of a CPU is not preferred, and a network device which supports high-end services requiring high-speed CPU processing capacity, such as security and firewall.

Assumed examples of the terminals 1 to 3 and the control server 20 include computing machines, such as personal computers, thin client terminals/servers, workstations, mainframes and supercomputers.

Assumed examples of the network switch forwarding engine 100 include a semiconductor integrated circuit such as a board adapted to LAN (a mother board or an I/O board), a network adapter such as an NIC (network interface card), and a similar extension card. In this embodiment, the network switch forwarding engine 100 is assumed as incorporating a network processor, in order to perform high-speed processing with hardware.

Assumed examples of the equipment management device 400 include a temperature sensor which monitors temperature changes in the switching node, a control device which controls a fan, a device related to throttling and the like. Alternatively, the equipment management device 400 may be a power supply monitor circuit or a power supply switch apparatus which starts and halts supply of the electric power into the switching node 10 in response to an external signal or a register configuration. Also, the equipment management device 400 is not limited to control or manage the switching node 10 itself; the equipment management device 400 may be a dedicated integrated circuit (IC) or an expansion card for controlling devices and apparatuses which are under control of the switching node 10.

The CPU 600 is merely an example of the processor. The CPU 600 may be a microprocessor, a microcontroller or an integrated circuit (IC) having such a function. The CPU 600 may include a hardware monitor which monitors various state changes in the switching node 10 by using the equipment management device 100. Also, the CPU 600 may have the function of remotely controlling turn-on and -off of the power supply switch of the switching node 10.

Examples of the memory 650 may include semiconductor memory devices, such as RAMs (random access memories), ROMs (read only memories), EEPROMs (electrically erasable and programmable read only memories) and flash memories, auxiliary memory units, such as HDDs (hard disk drives), SSDs (solid state drives), and removable disks and recording media, such as DVDs (digital versatile disks) and SD (secure digital) memory cards.

It should be noted that actual implementations are not limited to these examples.

[Relation with OpenFlow Technology]

In the OpenFlow technology, the control server 20 controls communication paths in the system as a controller. The OpenFlow technology is a technology in which a controller achieves routing and node control by setting multi-layer routine information to switches in units of flows in accordance with a routing policy.

In the OpenFlow technology, a controller monitors switches in the network and dynamically sets packet delivery paths to the switches in the network in response to the communication status. This allows separating the routing function from routers and switches, enabling optimum routing and traffic management by central control by the controller. Switches to which the OpenFlow technology is applied handle a communication as an end-to-end flow, not in units of packets or frames as is the case with conventional routers and switches.

For example, the control server 20 controls the operation of the switching node 10 (for example, relaying operations of packet data) by registering flow entries into a flow table of the switching node 10.

Registered in the flow table are flow entries which each define a predetermined action to be done for packets which match a predetermined matching condition (rule). A group of packets (or a sequence of packets) which match a rule are referred to as flow. The rule of a flow is distinguishably defined with various combinations using any or all of the destination address, the source address, the destination port and the source port, which are included in the header area of each protocol layer of the packets. It should be noted that the above-mentioned address may include the MAC (media access control) address and the IP (Internet protocol) address. In addition, information of the ingress port may be used in the rule of a flow.

Details of the OpenFlow technology are described in non-patent literature 1.

[Configuration of Network Switch Forwarding Engine]

Figure 5:
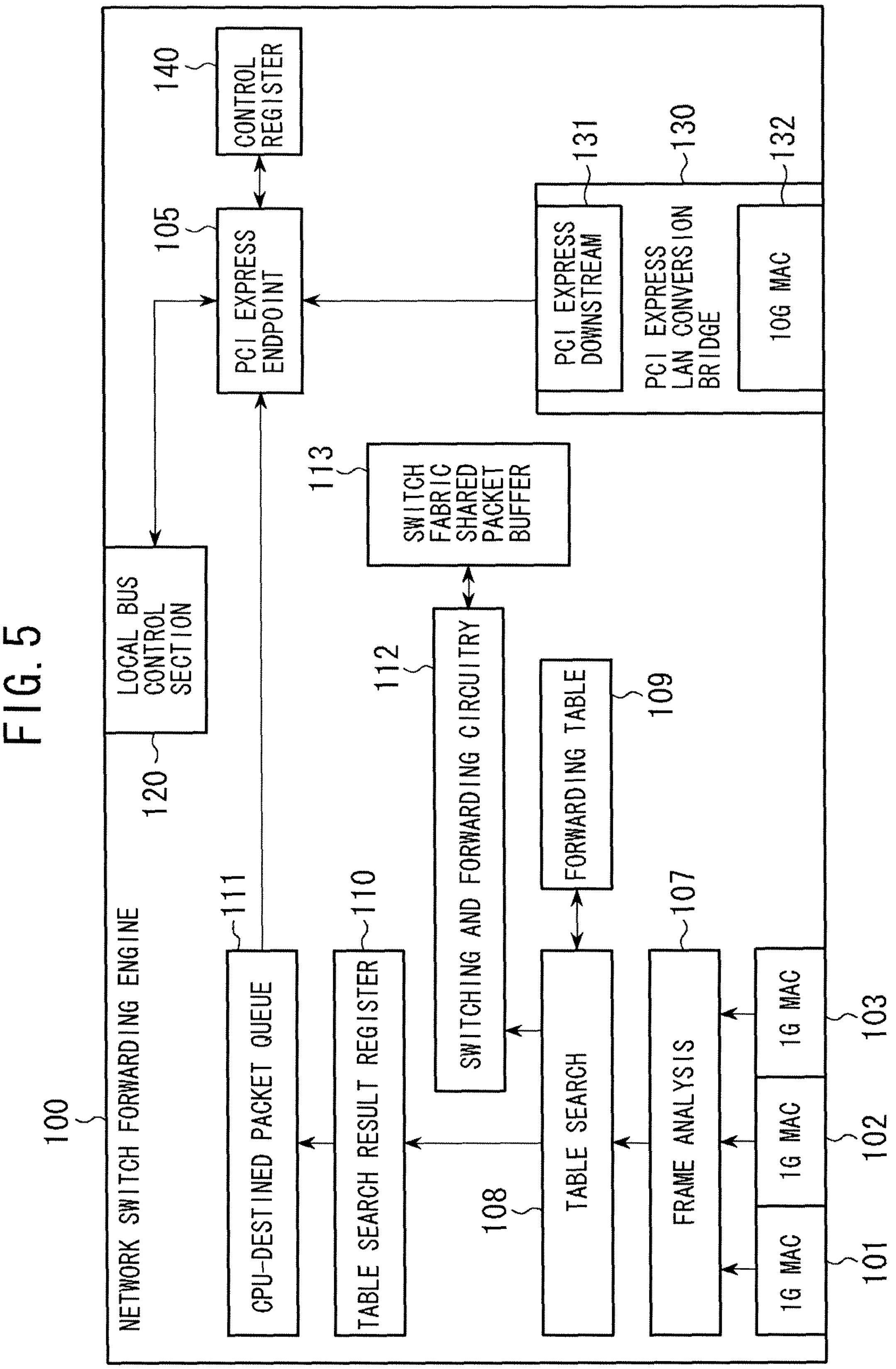
FIG. 5 is a schematic diagram showing an example of the configuration of a network switch forwarding engine in the present invention.

FIG. 5 shows a detailed configuration example of the network switch forwarding engine. The network switch forwarding engine 100 includes LAN interfaces (1G MAC) 101, 102, 103, a PCI express endpoint 105, a frame analysis processing section 107, a table search section 108, a forwarding table 109, a table search result register 110, a CPU-destined packet queue 111, a switching and forwarding circuitry 112, a switch fabric shared packet buffer 113, a local bus control section 120, a PCI express LAN conversion bridge 130, and a control register 140.

The LAN interface (1G MAC) 101, 102 and 103 are provided for receiving frames from the terminal 1 to 3, respectively.

The PCI express endpoint 105 forms a control bus interface of the network switch forwarding engine. In this embodiment, the PCI express endpoint 105 is connected to the CPU-destined packet queue 111, the local bus control section 120 and the PCI express LAN conversion bridge 130.

The frame analysis processing module 107 analyzes the frames received by the LAN interfaces (1G MAC) 101, 102 and 103. The table search section 108 searches the forwarding table 109 for the destinations (the forward destinations) of the frames on the basis of the analysis results of the frames. The forwarding table 109 stores information related to the destinations (the forward destinations) of frames. In one example, the forwarding table 109 is a flow table in the OpenFlow technology. The table search section 108 finds the matching flow entry in the forwarding table 109 on the basis of various information included in the header area of each frame, and determines the destination (forward destination) of the frame in accordance with the action defined in the flow entry.

The table search result register 110 holds the search results of the forwarding table for frames addressed to the control server 20 and the equipment management device 400. In this embodiment, the table search result register 110 holds the results of the search of the forward table 109 for the destinations (the forward destinations) of the frames. The CPU-destined packet queue 111 is provided to achieve queuing of frames in exchanging frames with the control server 20 or the equipment management device 400.

The switching and forwarding circuitry 112 performs switching and forwarding of frames in the network switch forwarding engine 100. The switch fabric shared packet buffer 113 is provided to achieve buffering in frame forwarding.

It should be noted that the data format in queuing and buffering may be the frame format or the packet format. This is because data in the packet format are converted into data in the frame format when being transmitted by the PCI express and the LAN interface.

The local bus control section 120 controls an internal bus used to communicate with the equipment management device 400. The network switch forwarding engine 100 receives information from the equipment management device 400 and configures the equipment management device 400 by using the local bus control section 120.

The PCI express LAN conversion bridge 130 is a conversion bridge used for communicating with the control server 20 via an LAN interface.

The PCI express LAN conversion bridge 130 includes a PCI express downstream 131 and a LAN interface (10G MAC) 132.

The PCI express downstream 131 exchanges PCI express frames with the PCI express endpoint 105. It should be noted that, in the present invention, the term "downstream" is merely a convenient expression for easy understanding of the invention; the term "downstream" does not mean one-way stream in the downward direction.

The PCI express LAN conversion bridge 130 performs a frame conversion between the PCI express downstream 131 and the LAN interface (10G MAC) 132, providing a conversion between PCI express frames and ether frames.

The LAN interface (10G MAC) 132 exchanges ether frames with the control server 20.

The control register 140 holds information used for controlling the operation of the network switch forwarding engine 100. The control register 140 holds information received from the equipment management device 400. The control register 140 may hold configuration information related to the equipment management device 400.

[Configuration of Control Server]

Figure 6:
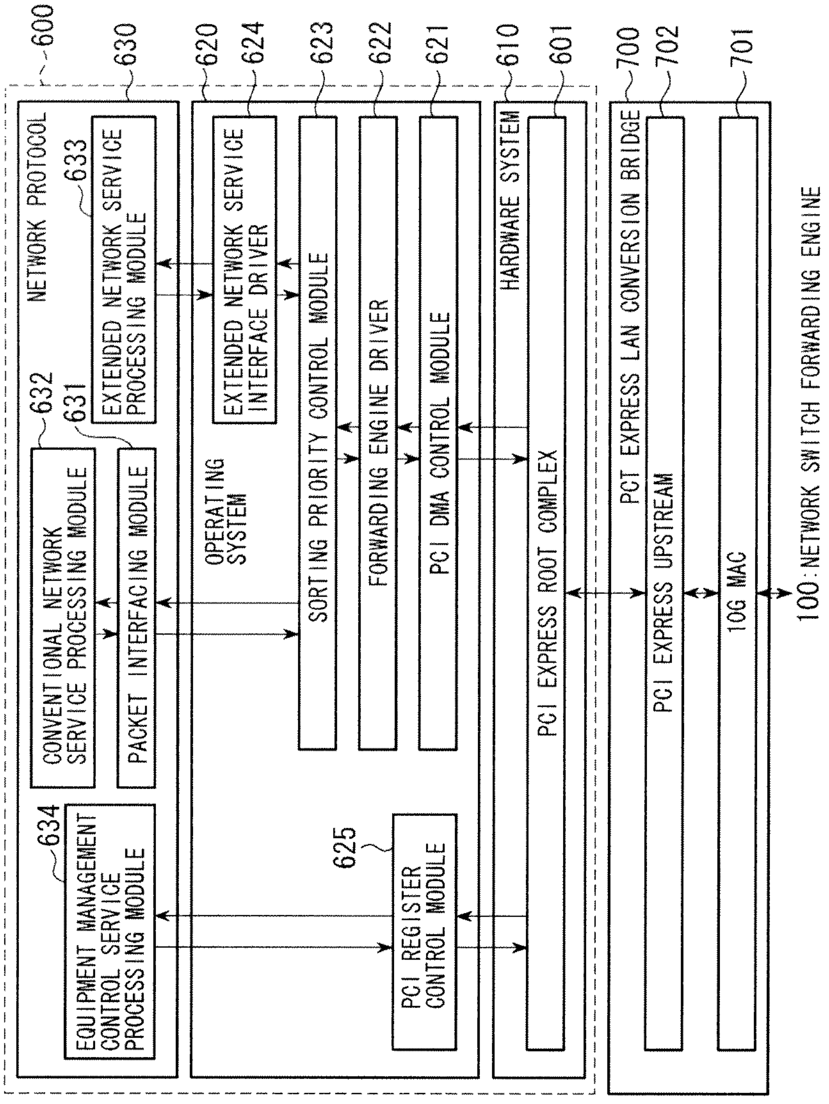
FIG. 6 is a schematic diagram showing an example of the configuration of a control server in the present invention.

FIG. 6 shows a configuration example of the control server 20. It should be noted that this configuration may be implemented as a software configuration realized by programs and the like or as a hardware configuration realized by circuits and the like.

The control server 20 includes a CPU 600 and a PCI express LAN conversion bridge 700.

The CPU 600 includes a hardware system 610, an operating system 620 and a network protocol 630.

The hardware system 610 includes a PCI express root complex 601.

The PCI express root complex 601 is provided for communicating with the PCI express LAN conversion bridge 700. The PCI express root complex 601 is a PCI express device and functions as a root complex.

The operating system 620 includes a PCI DMA control module 621, a forwarding engine driver 622, a sorting priority control module 623, an extended network service interface driver 624 and a PCI register control module 625.

The PCI DMA control module 621 performs DMA (direct memory access) transfer control for the network switch forwarding engine 100 by using a PCI express device.

The forwarding engine driver 622 is provided for controlling the network switch forwarding engine 100 through the PCI express. In this embodiment, the forwarding engine driver 622 uses the PCI DMA control module 621. It should be noted that the PCI DMA control module 621 may be implemented as one of the functions of the forwarding engine driver 622.

The sorting priority control module 623 analyses received frames, and performs sorting, determining which of protocols related to conventional network services and protocols related to extended network services each packet uses; the sorting priority control module 623 performs priority control for packets related to important processes.

The extended network service interface driver 624 serves as an intermediary for performing processes related to extended network services, depending on the received frames. In this embodiment, the extended network service interface driver 624 provides an interface for common extended network services, absorbing differences among services and protocols performed on the control server 20 and differences among hardware interfaces.

The PCI register control section 625 performs register control for a PCI express device. In this embodiment, the PCI register control section 625 performs register control for the control register 140 on the network switch forwarding engine 100 through the PCI express root complex 601.

The network protocol 630 includes a packet interfacing module 631, a conventional network service processing module 632, an extended network service processing module 633 and an equipment management control service processing module 634.

The packet interfacing module 631 exchanges frames with the switching node 10 in the packet format. The packet interfacing module 631 performs frame interfacing with the PCI express LAN conversion bridge 700 by using the forwarding engine driver 622. In this embodiment, the packet interfacing module 631 provides DMA transfer control for the PCI express LAN conversion bridge 700 by using the forwarding engine driver 622 and the PCI DMA control module 621. Also, the packet interfacing module 631 converts frames received from the forwarding engine driver 622 into the packet format.

The conventional network service processing module 632 performs processes related to conventional network services for packets received from the packet interfacing module 631.

The extended network service processing module 633 performs processes related to extended network services in response to a control by the extended network service interface driver 624.

The equipment management control service processing module 634 performs processes related to equipment management control services for the switching node 100, in response to instructions and commands received from the PCI register control module 625. In this embodiment, the equipment management control services, which are directed to the switching node 10, are services of performing processes related to management and control of the switching node 10 on behalf of the switching node 10.

The PCI express LAN conversion bridge 700 includes a LAN interface (10G MAC) 701 and a PCI express upstream 702.

The LAN interface (10G MAC) 701 exchanges ether frames with the switching node 10.

The PCI express LAN conversion bridge 700 performs frame conversion processes between the LAN interface (10G MAC) 701 and the PCI express upstream 702, providing a conversion between ether frames and PCI express frames. It should be noted that, in the present invention, the term "upstream" is merely a convenient expression for easy understanding of the invention; the term "downstream" does not mean one-way stream in the upward direction.

The PCI express upstream 702 exchanges PCI express frames with the PCI express root complex 601.

[Basic Operation]

Next, a description is given of the operation in this embodiment with reference to FIGS. 4, 5 and 6.

In this embodiment, the switching node 10 receives various packets from the terminals 1, 2 and 3 on the network. The control server 20 performs controls for transfer in the optimum path and cooperation with other servers, for packets received by the switching node 10 from the network, improving the network service.

In the switching node 10, the LAN interfaces (1G MAC) 101, 102 and 103 within the network switch forwarding engine 100 receive frames from the terminals 1, 2 and 3.

The frame analysis processing section 107 in the network switch forwarding engine 100 analyses the headers of the received frames.

In order to determine the forwarding method of each received frame, the table search module 108 then searches the forwarding table 109 to find the process (action) for the frame.

[Processes to be Performed on Frames]

Processes to be performed on frames can be schematically classified into the following three types (process "1", process "2" and process "3").

[Process "1"]

The first type is directed to the case when the destination and the action have been already described in the forward table 109, depending on the service and the protocol. In this case, the switching and forwarding circuitry 112 performs switching to the destination in accordance with the contents of the description and forwards the frame to the exterior.

[Process "2"]

The second type is directed to the case when a frame which uses a conventional network service is newly inputted. In this case, the table search section 108 stores inputted port information and the result of the table search into the table search result register 110, and stores the frame into the CPU-destined packet queue 111 in the packet format.

When the frame is stored in the CPU-destined packet queue 111 in the packet format, the network switch forwarding engine 100 sends an interruption notification and the like to the CPU 600, which is connected to the PCI express endpoint, by using a PCI express frame, to thereby notify that the frame is stored.

In this case, the PCI express frame is transmitted from the PCI express endpoint 105 to the PCI express downstream 131, converted into an ether frame in the PCI express LAN bridge 130, and transmitted to the external control server 20 via the LAN interface (10G MAC) 132 by using the ether frame.

In the control server 20, the LAN interface (10G MAC) 701 receives this ether frame. The PCI express LAN conversion bridge 700 reproduces the PCI express frame from the ether frame, and transmits the PCI express frame to the CPU 600 via the PCI express upstream 702.

In order for the CPU 600, which is connected to the PCI express LAN conversion bridge 700 with the PCI express, to receive the frame, the forwarding engine driver 622 performs DMA control for the network switch forwarding engine 100 by using the PCI DMA control section 621, to thereby complete the reception of the frame.

The sorting priority control module 623 analyses the frame and checks the kind of the packet carried by the frame and its importance (priority). The sorting priority control module 623 performs data sorting and priority control for importance processes; a CPU-destined packet (a packet which uses a conventional service protocol) is transmitted to the packet interfacing module 631 and a packet which uses an extended service protocol is transmitted to the extended network service interface driver 624.

The conventional network service processing module 632 analyses the packet received from the packet interfacing module 631. When receiving the analysis result from the conventional network service processing module 632, the packet interfacing module 631 transmits a frame based on the analysis result to the exterior again, by using the PCI express. The packet interfacing module 631 also performs configuration of the network switch forwarding engine 100 and the like for frames to be received for the future by using the PCI express.

[Process "3"]

The third type is directed to the case when a frame which uses an extended service protocol on the control server is newly inputted. In this case, as is the case with process "2" described above, the table search section 108 stores inputted port information and the result of the table search in the table search result register 110 and stores them in the CPU-destined packet queue 111 as a frame for which an extended service protocol is to be used.

After the frame is stored in the CPU-destined packet queue 111, in order to determine the action to be done for the packet, the network switch forwarding engine 100 sends an interruption notification to the CPU 600 connected to the PCI express endpoint 105 by using a PCI express frame as an inquiry process to the control server in the same procedure as the process related to the conventional network service to notify that the frame is stored in the CPU-destined packet queue 111.

In this case, the PCI express frame is transmitted from the PCI express endpoint 105 to the PCI express downstream 131, converted into an ether frame in the PCI express LAN conversion bridge 130, and transmitted to the external control server 20 via the LAN interface (10G MAC) 132 by using the ether frame.

Accordingly, the present invention achieves high-speed communications with the external control server without using the TCP/IP stack on the operating system and the network driver as in the case of the conventional technique.

In the control server 20, the LAN interface (10G MAC) 701 receives the ether frame. The PCI express LAN conversion bridge 700 reproduces the PCI express frame from the ether frame, and transmits the PCI express frame to the CPU 600 via the PCI express upstream 702.

In order for the CPU 600, which is connected to the PCI express, to receive the frame, the forwarding engine driver 622 performs DMA control for the network switch forwarding engine 100 by using the PCI DMA control module 621 to achieve the reception of the frame.

The sorting priority control processing module 623 analyses the frame to determine the kind of the packet carried by the frame and its importance (priority). In this case, the sorting priority control processing module 623 determines that the packet uses an extended service protocol, and delivers the data to the extended network service interface driver 624.

Since the forwarding engine driver 622 depends on devices, the extended network service interface driver 624 performs mapping which matches the interface of the network switch forwarding engine 100 with a common interface specification, in order to manage the switching node 10, which includes a plurality of different devices, in the process related to the extended network service.

The extended network service processing module 633 performs protocol processing by using information of the inquiry frame received from the switching node 10. The extended network service processing module 633 then returns the destination information of the frame and the frame control information to the switching node 10 via the operating system 620, the hardware system 610, and the PCI express LAN conversion bridge 700.

Also in this case, the extended network service processing module 633 achieves high-speed data transfer to the switching node 10 by the device control method using a PCI express frame in the same way as in the frame reception, without using the TCP/IP and the network protocol. In this case, the PCI express LAN conversion bridge 700 converts the PCI express frame into an ether frame, and transmits the ether frame to the switching node 10.

In the switching node 10, the LAN interface (10G MAC) 132 receives the frame from the control server 20. The PCI express LAN conversion bridge 130 converts the ether frame into a PCI express frame.

The network switch forwarding engine 100 then checks the control contents of the frame. When the control contents are control instructions for specific frames, the network switch forwarding engine 100 performs controls of configuration of the forward table 109 and operation configuration by using the control register 140 or performs control of the equipment management device 400 via the local bus control section 120.

<Feature of the Present Invention>

The present invention achieves the function of a conventional service protocol process and a high-end service protocol process function in the network switch node by using an external control server.

The present invention allows a system including a switching node 10 and a control server 20 as shown in FIG. 4 to achieve high-speed exchanges of control frames between the switching node and the control server, providing the function of realizing a conventional network service process, an equipment management control service process and an enhanced-speed and high-end service protocol process on the control server.

In FIG. 4, control frames transmitted from the network forwarding engine 401 are converted into an LAN by using the PCI express LAN conversion bridge 130 based on a PCI express frame which can control a switch without intervening a CPU and the like, and the control frames are transmitted to the control server 20, which is remotely located, as they are.

The control server 20 receives the ether frame with the PCI express LAN conversion bridge 700, converts the ether frame into the PCI express, and transmits the frame to the CPU 600 on the control server 20.

The CPU 600 can receive and transmit PCI express frames at a high speed with the minimum CPU load, by using the PCI express root complex 601 without using a network stack such as TCP/IP through DMA control and PCI register access.

The network service processing module operating on the CPU 600 can receive the relevant frame with a low load at a high speed, performing a service process at a high speed. After the process is performed, as is the case with the reception process, a control frame is transmitted from the CPU 600 in the format of the PCI express frame, converted into an ether frame by the PCI express LAN conversion bridge 700, and transmitted to the switching node 10, which is remotely located.

As is the case of the transmission, the switching node 10 receives the relevant frame with the PCI express LAN conversion bridge 130 without using a CPU and the like, and then converts the ether frame into a PCI express frame. The network switch forwarding engine directly controls a register or a table at a high speed in accordance with the contents of the frame.

A CPU and a network protocol such as TCP/IP, which are conventionally used for control from a remote control server (external server), are not used in the switching node, and this enables a high-end and high-speed network service which can achieve high-speed control with a low load, cooperate with the control server and make effective use of high-speed CPU processing ability of the remote control server.

<Summary of Configuration>

A remote control system of the present invention includes a switching node and an external control server.

The external control server includes an extended network service interface driver which uses a PCI express LAN conversion bridge, and performs an extended network service process which can achieve high-speed control.

Also, the external control server includes a forwarding engine driver which uses a PCI express LAN conversion bridge and remotely performs a conventional network service process for the switching node.

Furthermore, the external control server includes a PCI register control section which uses a PCI express LAN conversion bridge and remotely performs an equipment management control service.

The network forwarding engine on the switching node includes a PCI express LAN conversion bridge and controls a control register and a local bus control section from the external control server, which is remotely located, via an internal PCI express endpoint.

The network switch forwarding engine includes a bridge which converts PCI express frames into ether frames, the bridge being connected to a PCI express endpoint used for achieving control from an external CPU, including packet interfacing addressed to a register and a table in the engine and the CPU; the network switch forwarding engine converts PCI express frames, which are used for internal control, into ether frames and forwards the ether frames to the external control server, which is remotely located.

Also, the network switch forwarding engine includes a local bus control interface which manages an equipment management device in the switching system, and is internally connected to the PCI express endpoint; this provides a mechanism which can control any of the network switch forwarding engine and the equipment management device via the PCI express endpoint.

The external control server includes a bridge which converts ether frames into PCI express frame, and is configured to convert ether frames received from the switching node into PCI express frames and to forward the PCI express frames to a root complex of the CPU of the control server.

Since the PCI express frames forwarded to the root complex of the CPU are in accordance with an internal bus interface protocol handling the CPU and I/O's, the forwarded PCI express frames are exchanged at a high speed on the PCI control interface, such as DMA control and PCI register control in the operating system on the CPU without using a network protocol such as a TCP/IP stack.

The inputted PCI express frames are used for register access for device control and DMA transfer control for packet transfer and table setting. The present invention uses such mechanism; the present invention can perform an more advanced equipment management control service process and perform conventional network service control, from the CPU on the external control server at a higher speed than the CPU usually exiting in the switching system, through PCI register control, PCI DMA control and forwarding engine driver, as is the case with the conventional control from the CPU within the switching node.

Also, since a plurality of devices are remotely managed, the extended network service processing module, which have conventionally performed remote management of a plurality of devices via the same interface by using a network protocol such as the TCP/IP stack, experiences the difference in the interface among the devices when performs direct control by using the PCI express.

The extended network service processing module disguises the interface same as that used for a conventional network service process as the interface used for an extended network service process and uses an interface driver which is used for the extended network service to perform mapping between this interface and interfaces used for directly controlling the devices (switching nodes), in order to hide the difference in the device control; the extended network service processing module thereby achieves high-speed control of different switching systems with the same interface, without using a conventional network protocol such as the TCP/IP stack.

<Summary>

As thus discussed, in the present invention, the switching node does not incorporate a conventional network service processing module which controls the forwarding engine and a CPU which performs equipment management. In addition, the TCP/OP and a network protocol are not used in the switching node and in the external control server which performs an extended network service process. Furthermore, the present invention realizes a configuration in which the switching node directly uses the CPU on the external control server to perform an equipment management control service and an extended network service at a high-speed.

In the present invention, the forwarding engine incorporates a PCI express, a PCI express LAN conversion bridge and a circuit which can access to a local bus control section from the PCI express on the switching node. The external control server incorporates an extended network service interface driver for managing a plurality of switching nodes. This enables a switching node configuration which makes use of the external control server with the minimum impact of software to achieve a high-speed and high-end service, excluding a CPU.

Also, reduction in the power consumption of the switching node is expected due to the exclusion of the CPU, causing an improvement in tolerance to the severe environment, such as the high-temperature environment; highly-integrated CPUs are weak against heat.

An improvement in the maintainability is also expected, since no CPU is mounted in the switching node and software is installed only on the external control server.

Is should be noted that the switching node may physically incorporate a CPU if the CPU is not used; the CPU may be halted or stopped, the power of the CPU may be stopped or the CPU is placed into the unused state. That is, the switching node may be placed into a state equivalent to a state in which the CPU is excluded. It can be said that a switching node which does not use any CPU is equivalent to that which does not incorporate any CPU in that no power is consumed for control and monitoring of a CPU.

Accordingly, when the present invention is applied to a switching node which incorporates a CPU, the present invention is expected to cause advantageous effects of reducing the processing load and the monitoring load of the CPU in the equipment and reducing the hardware stress caused by the temperature increase in the equipment and throttling.

Although embodiments of the present invention are described in detail, the present invention is not limited to the above-described embodiments in an actual implementation; the scope of the present invention encompasses modifications which do not depart from the substance of the present invention.

For example, the present invention is applicable to a normal network configuration in which there is no external control server which performs routing control of switching nodes, by using an apparatus which is dedicated to provide function expansion of the switching nodes.

<Note>

The present application claims priority based on Japanese patent application No. 2010-037533 and the disclosure of Japanese patent application No. 2010-037533 is incorporated herein by reference.

The invention claimed is:

1. A remote control system, comprising:

a switching node which does not incorporate a CPU, the switching node being connected to a plurality of terminals; and an external control server which remotely controls said switching node, wherein said switching node includes:

a forwarding engine comprising hardware which performs a forwarding of frames between the plurality of terminals, wherein said forwarding engine includes a first PCI express LAN conversion bridge providing a conversion of a first ether frame received from said external control server into a first PCI express frame, and wherein said forwarding engine is controlled in response to a content of said first PCI express frame, wherein said forwarding engine generates a second PCI express frame to request said external control server for a provision of an equipment management control service for said switching node in response to an analysis on frames received from the plurality of terminals, and wherein said first PCI express LAN conversion bridge converts said second PCI express frame into a second ether frame and transmits said second ether frame to said external control server.

2. A switching node, comprising:

a forwarding engine which comprises hardware which performs a forwarding of frames between a plurality of terminals, wherein said forwarding engine includes a first PCI express LAN conversion bridge providing a conversion of a first ether frame received from said external control server into a first PCI express frame, and wherein said forwarding engine is controlled in response to a content of said first PCI express frame, wherein said forwarding engine generates a second PCI express frame to request said external control server for a provision of an equipment management control service for said switching node in response to an analysis on frames received from the plurality of terminals, and wherein said first PCI express LAN conversion bridge converts said second PCI express frame into a second ether frame and transmits said second ether frame to said external control server.

3. A remote control method for remotely controlling a switching node by an external control server, said method comprising:

by a PCI express LAN bridge in a forwarding engine which comprises hardware provided in said switching node to perform forwarding of frames between a plurality of terminals, providing a conversion of a first ether frame received from said external control server into a first PCI express frame;

controlling said forwarding engine in response to a content of said first PCI express frame;

by said forwarding engine, generating a second PCI express frame to request a provision of an equipment management control service for said switching node to said external control server in response to an analysis on frames received from the plurality of terminals; and by said first PCI express LAN conversion bridge, converting said second PCI express frame into a second ether frame and transmitting said second ether frame to said external control server.

4. A non-transitory recording medium recording a remote control program which when executed causes a switching node to perform:

by a PCI express LAN bridge in a forwarding engine which comprises hardware provided in said switching node to perform a forwarding of frames between a plurality of terminals, providing a conversion of a first ether frame received from said external control server into a first PCI express frame;

controlling said forwarding engine in response to contents of said first PCI express frame;

by said forwarding engine, generating a second PCI express frame to request a provision of an equipment management control service for said switching node to said external control server in response to an analysis on frames received from the plurality of terminals; and by said first PCI express LAN conversion bridge, converting said second PCI express frame into a second ether frame and transmitting said second ether frame to said external control server.

5. The remote control system according to claim 1, wherein said external control server includes:

an external interface transmitting said first ether frame to said switching node and receiving said second ether frame from said switching node;

a second PCI express LAN conversion bridge which converts a third PCI express frame into said first ether frame and converts said second ether frame into a fourth PCI express frame; and an extended network service interface driver which generates said third PCI express frame, transmits said third PCI express frame to said second PCI express conversion bridge via an internal bus in said external control server, receives said fourth PCI express frame from said second PCI express conversion bridge via said internal bus, and hides a difference in a device control by disguising an interface same as that used for a conventional network service process as an interface used for an extended network service process and performing a mapping between said interface and an interface which directly controls said switching node.

6. The remote control method according to claim 3, further comprising:

by an external interface of said external control server, transmitting said first ether frame to said switching node and receiving said second ether frame from said switching node;

by using a second PCI express LAN conversion bridge in said external control server, converting a third PCI express frame into said first ether frame;

by said second PCI express LAN conversion bridge converting said second ether frame into a fourth PCI express frame;

by an extended network service interface driver, generating said third PCI express frame and transmitting said third PCI express frame from said extended network service interface driver to said second PCI express LAN conversion bridge via an internal bus in said external control server, by said extended network service interface driver, receiving said fourth PCI express frame from said second PCI express conversion bridge via said internal bus; and by said extended network service interface driver in said external control server, hiding a difference in device control by disguising an interface same as that used for a conventional network service process as an interface used for an extended network service process and performing mapping between said interface and an interface which directly controls said switching node.

7. The switching node according to claim 1, wherein said switching node further includes a register holding information for controlling an operation of said forwarding engine, and wherein said register is directly controlled in accordance with the content of said first PCI express frame.

8. The remote control method according to claim 3, wherein said switching node includes a register holding information for controlling an operation of said forwarding engine, wherein said controlling said forwarding engine includes directly controlling said register in response to the content of said first PCI express frame.

* * * * *